United States Patent
Buchner et al.

(10) Patent No.: US 11,329,968 B2
(45) Date of Patent: May 10, 2022

(54) AUTHENTICATION ACROSS DECENTRALIZED AND CENTRALIZED IDENTITIES

(71) Applicant: Microsoft Technology Licensing, LLC, Redmond, WA (US)

(72) Inventors: Daniel James Buchner, Los Gatos, CA (US); Brandon Murdoch, Reading (GB); Ankur Patel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 16/357,039

(22) Filed: Mar. 18, 2019

(65) Prior Publication Data

US 2020/0304480 A1    Sep. 24, 2020

(51) Int. Cl.
  *H04L 29/06*    (2006.01)
(52) U.S. Cl.
  CPC ............ *H04L 63/08* (2013.01); *H04L 63/102* (2013.01)
(58) Field of Classification Search
  CPC ....... H04L 63/08; H04L 63/102; H04L 9/321; H04L 2209/38; H04L 9/3239; G06F 21/45; G06F 21/33
  See application file for complete search history.

(56) References Cited

U.S. PATENT DOCUMENTS

| | | | |
|---|---|---|---|
| 10,263,787 B1* | 4/2019 | Gelman | H04L 9/3247 |
| 10,841,079 B1* | 11/2020 | Todd | H04L 9/3265 |
| 2008/0141377 A1* | 6/2008 | Dunagan | H04L 63/1433 726/25 |
| 2009/0288138 A1* | 11/2009 | Kalofonos | H04L 63/0884 726/2 |

(Continued)

FOREIGN PATENT DOCUMENTS

EP    3312756 A1    4/2018

OTHER PUBLICATIONS

Barbir, Abbie, "Updated text for X.dlt-sec, Security Considerations for using DLT data in Identity Management", In Proceeding of International Telecommunication Union, vol. 17, Issue 17, Jan. 3, 2019, 19 Pages.

(Continued)

*Primary Examiner* — Aravind K Moorthy
(74) *Attorney, Agent, or Firm* — Workman Nydegger (57) ABSTRACT

Permitting a decentralized identity to authenticate on behalf of a centralized identity to a centralized identity system, and/or permitting a centralized identity to authenticate on behalf of a decentralized identity to a decentralized identity system. Thus, the principles described herein permit authentication across decentralized and centralized domains. The identity system receives and registers a delegation for the first identity to authentic as the second identity, where one of the identities is a decentralized identity and one is a centralized identity. Thereafter, when the identity system (Continued)

receives a communication from the first identity to access a resource owned by the second identity, the identity system accesses the registration to determine that the first identity is authorized to authenticate as the second identity, authenticates the first identity as the second identity, and grants the first identity access to the resource owned by the second identity.

20 Claims, 5 Drawing Sheets

(56) References Cited

U.S. PATENT DOCUMENTS

| | | | | |
|---|---|---|---|---|
| 2015/0006884 | A1* | 1/2015 | Ackerly | H04L 63/062 713/155 |
| 2015/0150106 | A1* | 5/2015 | Lund | H04L 63/083 726/7 |
| 2016/0191243 | A1* | 6/2016 | Manning | H04L 9/321 713/168 |
| 2017/0012780 | A1* | 1/2017 | Kaliski, Jr | H04L 61/305 |
| 2017/0324738 | A1* | 11/2017 | Hari | H04L 63/08 |
| 2018/0034890 | A1* | 2/2018 | Singhvi | G06F 16/183 |
| 2018/0114220 | A1* | 4/2018 | Ekberg | H04L 9/007 |
| 2018/0123804 | A1* | 5/2018 | Smith | H04L 9/3213 |
| 2018/0152440 | A1* | 5/2018 | Hande | H04L 9/3213 |
| 2018/0183774 | A1* | 6/2018 | Campagna | H04L 9/3247 |
| 2018/0351747 | A1* | 12/2018 | Spangemacher | H04L 63/08 |
| 2018/0359096 | A1* | 12/2018 | Ford | H04L 9/3236 |
| 2019/0013943 | A1* | 1/2019 | Maim | H04L 9/30 |
| 2019/0042315 | A1* | 2/2019 | Smith | H04L 9/0637 |
| 2019/0109877 | A1* | 4/2019 | Samuel | H04L 9/0897 |
| 2019/0132295 | A1* | 5/2019 | Lenz | H04L 63/0428 |
| 2019/0140819 | A1* | 5/2019 | Dolev | H04L 63/0442 |
| 2019/0165941 | A1* | 5/2019 | Ray | H04L 9/321 |
| 2019/0229915 | A1* | 7/2019 | Digiambattista | H04L 9/321 |
| 2019/0230092 | A1* | 7/2019 | Patel | H04L 9/0869 |
| 2019/0273617 | A1* | 9/2019 | Maher | H04L 9/085 |
| 2019/0317924 | A1* | 10/2019 | Alimi | H04L 9/3297 |
| 2019/0349204 | A1* | 11/2019 | Enke | G06F 21/602 |
| 2019/0349346 | A1* | 11/2019 | Curtis | H04L 63/0428 |
| 2020/0004846 | A1* | 1/2020 | Camenisch | H04L 9/3239 |
| 2020/0007331 | A1* | 1/2020 | Wentz | H04L 9/321 |
| 2020/0037158 | A1* | 1/2020 | Soundararajan | G07G 1/0054 |
| 2020/0052886 | A1* | 2/2020 | Buldas | H04L 9/3247 |
| 2020/0128022 | A1* | 4/2020 | Bleikertz | H04L 9/3297 |
| 2020/0137064 | A1* | 4/2020 | Wu | H04L 9/3239 |
| 2020/0184099 | A1* | 6/2020 | Yang | G06F 21/6245 |
| 2020/0265031 | A1* | 8/2020 | Greven | G06F 16/27 |
| 2020/0313897 | A1* | 10/2020 | Heath | H04L 9/3263 |
| 2020/0322351 | A1* | 10/2020 | Jadav | H04L 9/3221 |
| 2020/0366716 | A1* | 11/2020 | Singh | G06N 20/00 |
| 2020/0394531 | A1* | 12/2020 | Rigotti | H04L 9/32 |
| 2020/0403795 | A1* | 12/2020 | Murdoch | G06Q 20/385 |
| 2021/0035120 | A1* | 2/2021 | Mullins | H04L 9/3247 |
| 2021/0037060 | A1* | 2/2021 | Robison | H04L 63/0876 |

OTHER PUBLICATIONS

Muhle, et al., "A Survey on Essential Components of a Self-Sovereign Identity", In Repository of axriv: 1807.06346, Jul. 17, 2018, 7 Pages.

"International Search Report and Written Opinion Issued in PCT Application No. PCT/US2020/015749", dated Apr. 30, 2020, 13 Pages.

Windley, et al., "Sovrin (TM) : A Protocol and Token for Self-Sovereign Identity and Decentralized Trust", In White Paper of Sovrin Foundation, Jan. 1, 2018, 42 Pages.

* cited by examiner

AUTHENTICATION ACROSS DECENTRALIZED AND CENTRALIZED IDENTITIES

BACKGROUND

Most currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments describe here relate to permitting a decentralized identity to authenticate on behalf of a centralized identity to a centralized identity system, and/or permitting a centralized identity to authenticate on behalf of a decentralized identity to a decentralized identity system. Thus, the principles described herein permit authentication across decentralized and centralized domains.

In the case of a decentralized identity authenticating as the centralized identity, the centralized identity system receives and registers a delegation for the decentralized identity to authentic as the centralized identity. Thereafter, when the centralized identity system receives a communication from the decentralized identity to access a resource owned by the centralized identity, the centralized identity system accesses the registration to determine that the decentralized identity is authorized to authenticate as the centralized identity. In response to that determination, the centralized identity system interacts with the decentralized identity to authenticate the decentralized identity as the centralized identity. Upon a successful authentication, the decentralized identity is granted access to the resource owned by the centralized identity. As legacy identity systems are centralized identity systems, this allows for decentralized identities to be used with legacy identity systems, without having to wait for identity systems to be modified to become decentralized identity systems.

In the case of a centralized identity authenticating as the decentralized identity, the decentralized identity system receives and registers a delegation for the centralized identity to authentic as the decentralized identity. Thereafter, when the decentralized identity system receives a communication from the centralized identity to access a resource owned by the decentralized identity, the decentralized identity system accesses the registration to determine that the centralized identity is authorized to authenticate as the decentralized identity. In response to that determination, the decentralized identity system interacts with the centralized identity to authenticate the centralized identity as the decentralized identity. Upon a successful authentication, the centralized identity is granted access to the resource owned by the decentralized identity. Thus, a user may have both a centralized and decentralized identity, and permit such identities to work with both centralized and decentralized identity systems.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments describe here relate to permitting a decentralized identity to authenticate on behalf of a centralized identity to a centralized identity system, and/or permitting a centralized identity to authenticate on behalf of a decentralized identity to a decentralized identity system. Thus, the principles described herein permit authentication across decentralized and centralized domains. The identity system receives and registers a delegation for the first identity to authentic as the second identity, where one of the identities is a decentralized identity and one is a centralized identity. Thereafter, when the identity system receives a communication from the first identity to access a resource owned by the second identity, the identity system accesses the registration to determine that the first identity is authorized to authenticate as the second identity, authenticates the first identity as the second identity, and grants the first identity access to the resource owned by the second identity.

In the case of a decentralized identity authenticating as the centralized identity, the centralized identity system receives and registers a delegation for the decentralized identity to authentic as the centralized identity. Thereafter, when the centralized identity system receives a communication from the decentralized identity to access a resource owned by the centralized identity, the centralized identity system accesses the registration to determine that the decentralized identity is authorized to authenticate as the centralized identity. In response to that determination, the centralized identity system interacts with the decentralized identity to authenticate the decentralized identity as the centralized identity. Upon a successful authentication, the decentralized identity is granted access to the resource owned by the centralized identity. As legacy identity systems are centralized identity systems, this allows for decentralized identities to be used with legacy identity systems, without having to wait for identity systems to be modified to become decentralized identity systems.

In the case of a centralized identity authenticating as the decentralized identity, the decentralized identity system receives and registers a delegation for the centralized identity to authentic as the decentralized identity. Thereafter, when the decentralized identity system receives a communication from the centralized identity to access a resource owned by the decentralized identity, the decentralized identity system accesses the registration to determine that the centralized identity is authorized to authenticate as the decentralized identity. In response to that determination, the decentralized identity system interacts with the centralized identity to authenticate the centralized identity as the decentralized identity. Upon a successful authentication, the centralized identity is granted access to the resource owned by the decentralized identity. Thus, a user may have both a centralized and decentralized identity, and permit such identities to work with both centralized and decentralized identity systems.

Conventional identity management systems are based on centralized authorities such as corporate directory services, certificate authorities, or domain name registries. From the standpoint of cryptographic trust verification, each of these centralized authorities serves as its own root of trust. A centralized identity is an identity that exists in dependence upon such a centralized authority. Accordingly, such a centralized authority is a "centralized identity system" as the term is used herein. In the figures, a centralized identity system is represented with a downward-pointing triangle in its upper right corner.

In contrast, in a decentralized identity system, decentralized identities are used to identify entities. In contrast to centralized identifiers, decentralized identities are under the control of the entity they identify, independent of any centralized authority. Entities are free to use any shared root of trust in verifying cryptographic trust of that decentralized identity. Globally distributed ledgers (or a decentralized P2P network that provides similar capabilities) provide a means for managing a root of trust with neither centralized authority nor a single point of failure. Such a distributed ledger or network are examples of a "decentralized identity system" is the term is used herein. More broadly, a decentralized identity system is any distributed system that manages resources owned by a decentralized identity. In the figures, a decentralized identity system is represented with a circle in its upper right corner.

Figure 1:
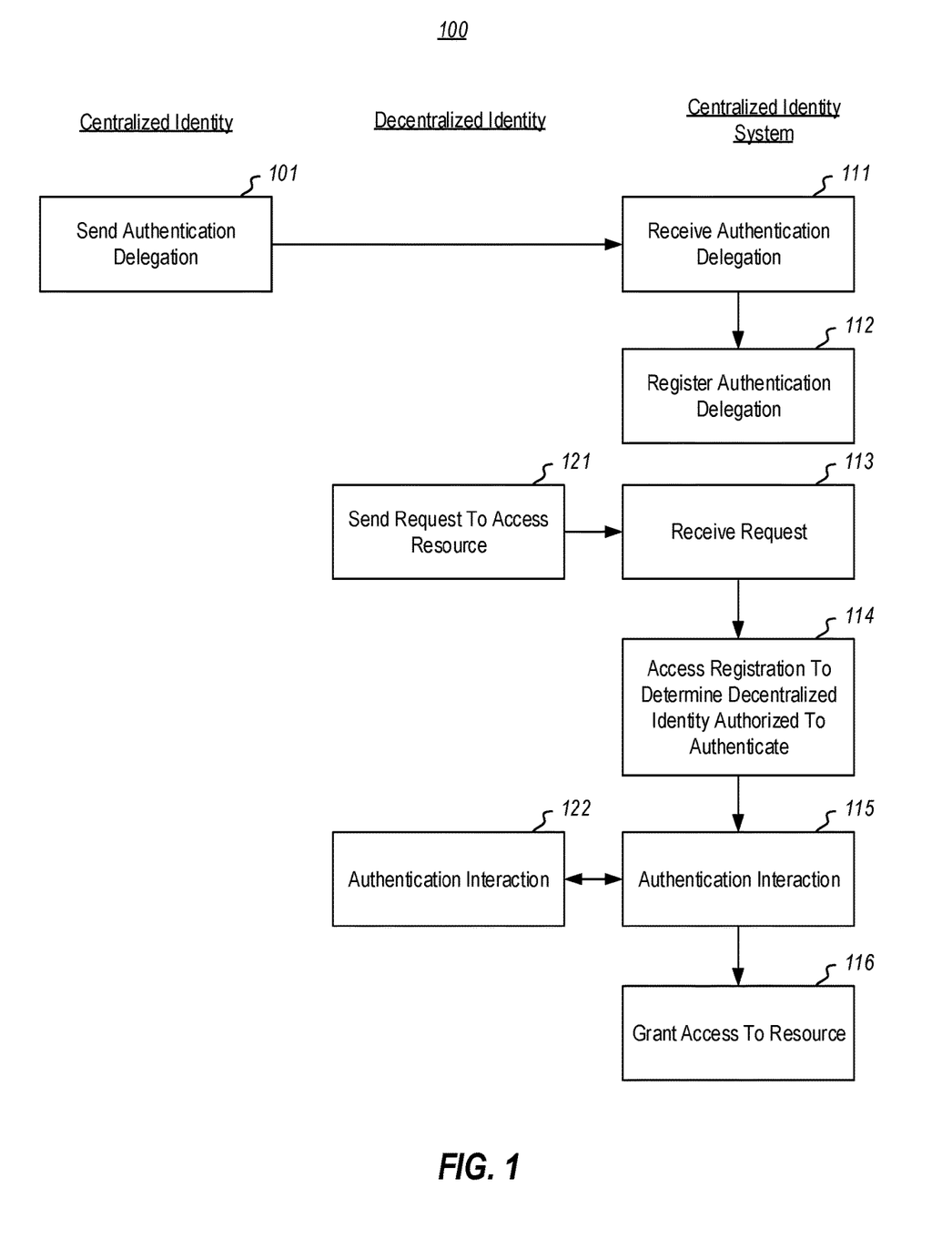
FIG. 1 illustrates a flowchart of a method for permitting a decentralized identity to authenticate to a centralized identity system on behalf of a centralized identity in accordance with a first embodiment described herein.
Figure 2:
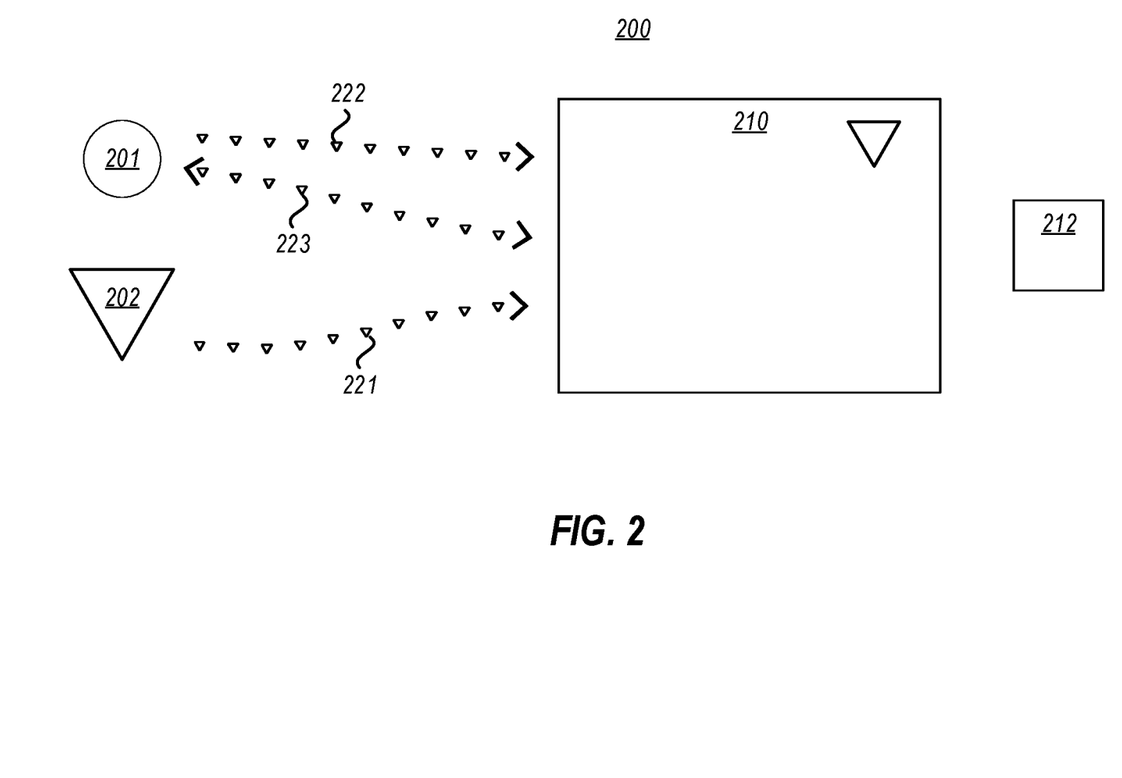
FIG. 2 illustrates a centralized identity environment in which a decentralized identity authenticates to a centralized identity system on behalf of a centralized identity, and is an example of an environment in which the method of FIG. 1 may operate.

FIG. 1 illustrates a flowchart of a method 100 for permitting a decentralized identity to authenticate to a centralized identity system on behalf of a centralized identity in accordance with a first embodiment described herein. FIG. 2 illustrates a centralized identity environment 200 in which a decentralized identity 201 authenticates to a centralized identity system 210 on behalf of a centralized identity 202. In the figures, decentralized identities are represented by a downward-pointing triangle, and centralized identities are represented by circles.

The method 100 of FIG. 1 may be performed within the centralized identity environment 200 of FIG. 1. Accordingly, FIGS. 1 and 2 will now be described with frequent reference to each other. FIG. 2 illustrates three main components, a decentralized identity 201, a centralized identity 202, and a centralized identity system 210. In FIG. 1, acts that are performed by the centralized identity 202 (or more specifically, the computing system operated by the centralized identity 202) are listed in the left column of FIG. 1 under the heading "Centralized Identity". Acts that are performed by the decentralized identity 201 (or more specifically, the computing system operated by the decentralized identity 201) are listed in the middle column of FIG. 1 under the heading "Decentralized Identity". Acts that are performed by the centralized identity system 210 are listed in the right column of FIG. 1 under the Heading "Centralized Identity System".

The centralized identity system 210 recognizes the centralized identity 202 as being one of the identities which owns resources managed by the centralized identity system 210. For instance, the centralized identity system 210 recognizes that the centralized identity 202 owns resource 212. Thus, if the centralized identity 202 were to request certain access to the resource 212, the centralized identity system 210 would grant that access upon authenticating the centralized identity 202. However, in this example, the centralized identity 202 now wishes to allow the decentralized identity 201 to authenticate on behalf of the centralized identity 202 so that the decentralized identity 201 is able to access the resource 212 just as the centralized identity 202 would.

Accordingly, referring to FIG. 1, the centralized identity 202 sends a delegation to the centralized identity system 210 for the decentralized identity 201 to authenticate as the centralized identity (act 101). This is represented by arrow 221 in FIG. 2. Accordingly, the centralized identity system 210 receives the delegation (act 111). In one embodiment, this communication is made using a centralized identity protocol. This is represented by the arrow 221 having a line composed of intermittent triangles.

A centralized identity protocol is a communication protocol that is recognized by a centralized identity system for purpose of authentication. As an example, Open ID Connect is a centralized identity protocol. For instance, the delegation may use an extension of the centralized identity protocol. In the example of the Open ID Connect protocol, such an extension may be performed by the centralized identity establishing a self-issued claim or scope in which the centralized identity makes an enforceable claim that the decentralized identity may authenticate on behalf of the centralized identity.

The centralized identity system 210 then registers the delegation so that the delegation may be later referred to when the time comes to enforce the delegation (act 112). The remaining portions of the method 100 may be performed each time a communication is received thereafter from the decentralized identity 201 to access a resource owned by the centralized identity 202. For instance, suppose that thereafter, the decentralized identity 201 sends a communication to the centralized identity system 210 requesting access to the resource 212 owned by the centralized identity 202 (act 121). The centralized identity system 210 would then receive that request communication (act 113). This communication is represented by arrow 222 in FIG. 2, and may also be in accordance with the centralized identity protocol, which is symbolized by the line of the arrow 222 being composed of intermittent triangles.

In response to this communication (act 113), the centralized identity system 210 accesses the registration to determine that the decentralized identity 201 is authorized to authenticate as the centralized identity 202 (act 114). Otherwise, the centralized identity system 210 may simply refuse the request without giving the decentralized identity 201 a chance to authenticate.

In response to a determination that the decentralized identity 201 has been given permission to authenticate on behalf of the centralized identity 202 (act 114), the centralized identity system 210 interacts with the decentralized identity 201 (acts 115 and 122) for purpose of allowing the decentralized identity 201 to attempt authentication. This is represented by bi-directional arrow 223 in FIG. 2. This interaction may also be in accordance with the centralized identity protocol, as symbolized by the arrow 223 having a line composed of intermittent triangles. As an example, if the centralized identity system 210 is expecting a username and password for the centralized identity 202, the decentralized identity 201 may instead provide that same username and password. If the centralized identity system 210 is expecting a particular certificate for the centralized identity 202, the decentralized identity 201 may instead provide that same certificate.

Completing the method 100, in response to a successful authentication (act 115), the centralized identity system 210 grants to the decentralized identity 201 access to the resource 212 owned by the centralized identity 202 (act 116). Thus, if a user owns both the decentralized identity 201 and the centralized identity 202, the user may use its decentralized identity 201 to access all of the resources that are being managed by this centralized identity system, or any other centralized identity system. Accordingly, the principles described herein may be used to allow a decentralized identity to access resources managed by legacy centralized identity management systems.

In a second embodiment, the roles of the centralized identity and decentralized identity are reversed, and now it is a decentralized identity system that is being authenticated to. Specifically, a decentralized identity delegates authority to a centralized identity to authenticate to a decentralized identity system on behalf of the decentralized identity.

Figure 3:
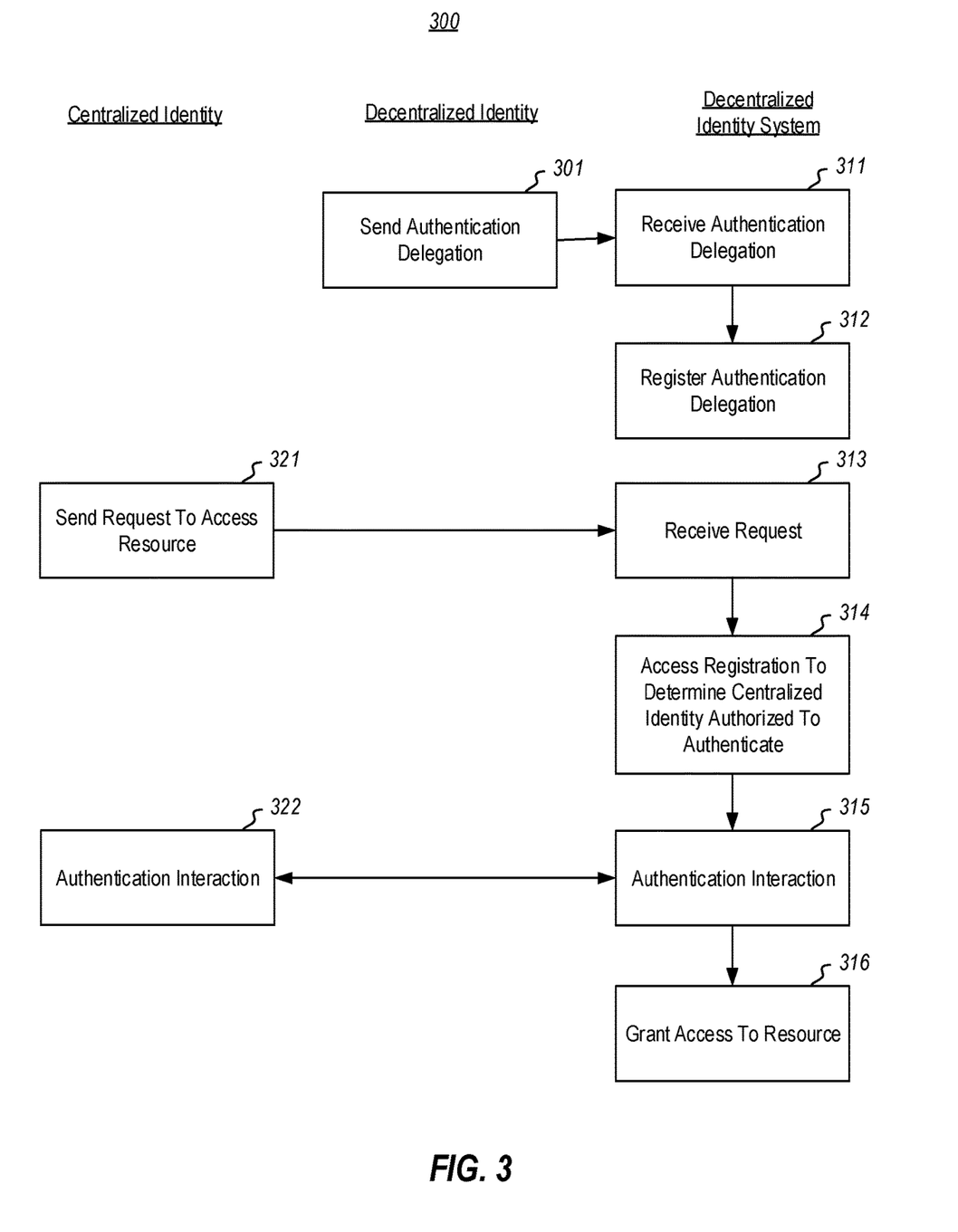
FIG. 3 illustrates a flowchart of a method for permitting a centralized identity to authenticate to a decentralized identity system on behalf of a decentralized identity in accordance with a second embodiment described herein.
Figure 4:
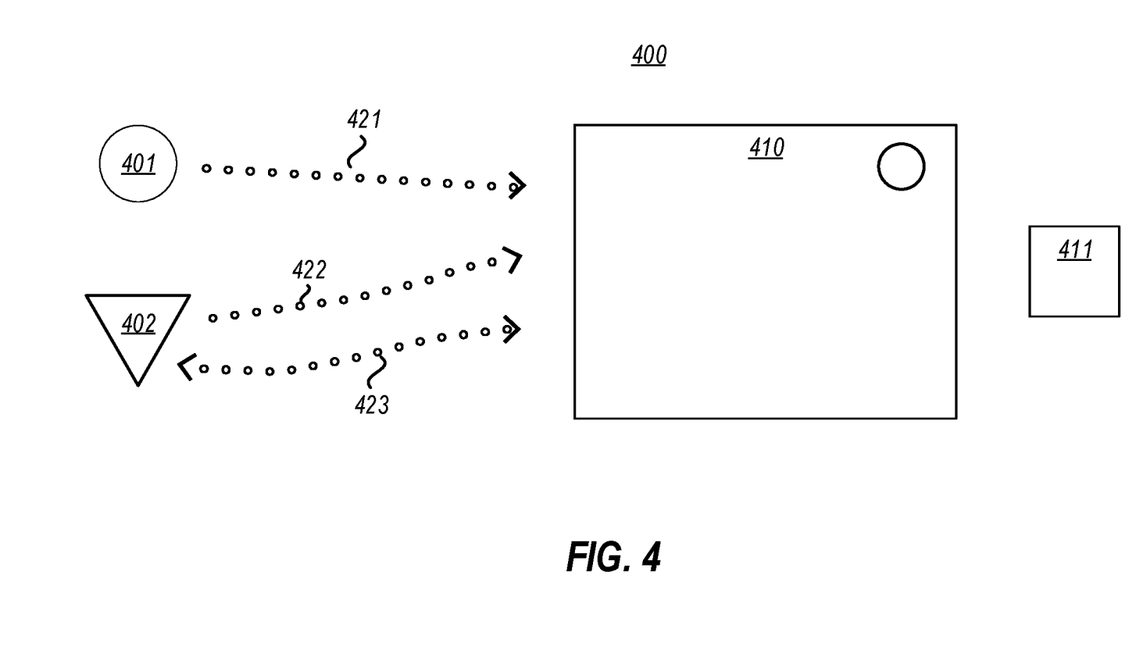
FIG. 4 illustrates a decentralized identity environment in which a centralized identity authenticates to a decentralized identity system on behalf of a decentralized identity, and is an example of an environment in which the method of FIG. 3 may operate.

FIG. 3 illustrates a flowchart of a method 300 for permitting a centralized identity to authenticate to a decentralized identity system on behalf of a decentralized identity in accordance with the second embodiment described herein. FIG. 4 illustrates a decentralized identity environment 400 in which a centralized identity 402 authenticates to a decentralized identity system 410 on behalf of a decentralized identity 401. FIGS. 3 and 4 are similar to FIGS. 1 and 2, respectively, except that the roles of the decentralized and centralized identities are reversed. In addition, as shown in FIG. 4, the identities are interacting with a decentralized identity system 410, rather than the centralized identity system 210. Accordingly, in FIG. 3, there is a heading "Decentralized Identity System" in the right column of FIG. 3. The identities 401 and 402 may, but need not, be the self-same identities as the respective identities 201 and 202 of FIG. 2.

The decentralized identity system 410 recognizes the decentralized identity 401 as being one of the identities which owns resources managed by the decentralized identity system 410. For instance, the decentralized identity system 410 recognizes that the decentralized identity 401 owns resource 411. Thus, if the decentralized identity 401 were to request certain access to the resource 411, the decentralized identity system 410 would grant that access upon authenticating the decentralized identity 401. However, in this example, the decentralized identity 401 now wishes to allow the centralized identity 402 to authenticate on behalf of the decentralized identity 401 so that the centralized identity 402 is able to access the resource 411 just as the decentralized identity 401 would.

Accordingly, referring to FIG. 3, the decentralized identity 401 sends a delegation to the decentralized identity system 410 for the centralized identity 402 to authenticate as the decentralized identity (act 301). This is represented by arrow 421 in FIG. 4. Accordingly, the decentralized identity system 410 receives the delegation (act 311). In one embodiment, this communication is made using a decentralized identity protocol. This is represented by the arrow 421 having a line composed of intermittent circles.

A decentralized identity protocol is a communication protocol that is recognized by a decentralized identity system for purpose of authentication. As an example, Decentralized Identifiers (DIDs) is a decentralized identity protocol that defines a data model and syntax for decentralized identifiers. For instance, the delegation may use an extension of the decentralized identity protocol. In the example of the DIDs protocol, such an extension may be performed by the decentralized identity establishing a claim within a DID document that makes an enforceable claim that the centralized identity may authenticate on behalf of the decentralized identity.

The decentralized identity system 410 then registers the delegation so that the delegation may be later referred to when the time comes to enforce the delegation (act 312). The remaining portions of the method 300 may be performed each time a communication is received thereafter from the centralized identity 402 to access a resource owned by the decentralized identity 401. For instance, suppose that thereafter, the centralized identity 402 sends a communication to the decentralized identity system 410 requesting access to the resource 411 owned by the decentralized identity 401 (act 321). The decentralized identity system 410 would then receive that request communication (act 313). This communication is represented by arrow 422 in FIG. 2, and may also be in accordance with the decentralized identity protocol, which is symbolized by the line of the arrow 422 being composed of intermittent circles.

In response to this communication (act 313), the decentralized identity system 410 accesses the registration to determine that the centralized identity 402 is authorized to authenticate as the decentralized identity 401 (act 314). Otherwise, the decentralized identity system 410 may simply refuse the request without giving the centralized identity 402 a chance to authenticate.

In response to a determination that the centralized identity 402 has been given permission to authenticate on behalf of the decentralized identity 401 (act 314), the decentralized identity system 410 interacts with the centralized identity 402 (acts 315 and 322) for purpose of allowing the centralized identity 402 to attempt authentication. This is represented by bi-directional arrow 423 in FIG. 4. This interaction may also be in accordance with the decentralized identity protocol, as symbolized by the arrow 423 having a line composed of intermittent circles. As an example, if the decentralized identity system 410 is expecting a certificate signed by a particular private key of the decentralized identity 401, the centralized identity 402 may instead provide that same certificate signed by the private key of the decentralized identity 401.

Completing the method 300, in response to a successful authentication (act 315), the decentralized identity system 410 grants to the centralized identity 402 access to the resource 411 owned by the decentralized identity 401 (act 316). Thus, if a user owns both the decentralized identity 401 and the centralized identity 402, the user may use either of its identities to authenticate to any identity system, centralized or not.

The centralized identity system 210 may be a computing system. Furthermore, the decentralized identity system 410 may be a collection of distributed computing systems. Furthermore, the decentralized identities 201 and 401, and the centralized identities 202 and 402 may operate with the assistance of a computing system. Such computing systems may be structured as described below for the computing system 500 of FIG. 5. Furthermore, for methods 100 and 300 described herein, such methods may be fully or partially performed by a computing system executing computer-executable instructions that are structured, such that when executed by one or more processors of the computing system, the computing system is caused to operate. Such computer-executable instruction may be comprised within a computer program product. Accordingly, a computing system 500 will now be described with respect to FIG. 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
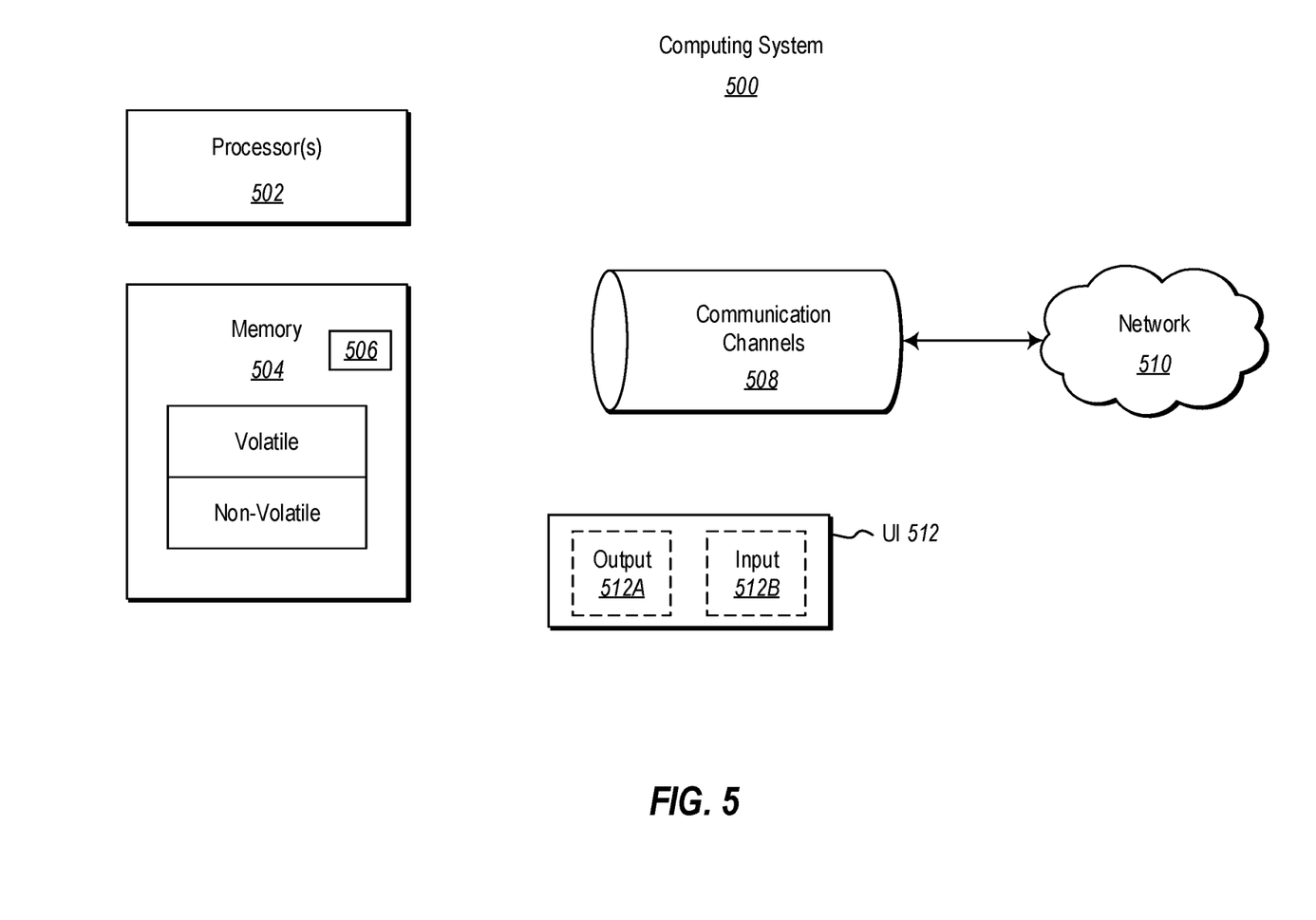
FIG. 5 illustrates an example computer system in which the principle described herein may be employed.

As illustrated in FIG. 5, in its most basic configuration, a computing system 500 typically includes at least one hardware processing unit 502 and memory 504. The memory 504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 500 has thereon multiple structures often referred to as an "executable component". For instance, the memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface 512 for use in interfacing with a user. The user interface 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, holograms, virtual reality, and so forth. Examples of input mechanisms 512B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface component (e.g., a "NIC"), and then eventually transferred to computing system RANI and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Traditionally, identity management systems are often built on centralized authorities including, but not limited to, employer directories, government organizations, email services, certificate authorities, and/or domain name registries.

On the other hand, decentralized identities are identities upon which authentication may be performed in a decentralized system. Examples of such decentralized systems include a distributed ledger in which the decentralized identity may be recorded. Another example of a decentralized system includes a peer-to-peer system in which authentication is performed within the peer-to-peer system, allowing computing systems within the peer-to-peer system to then take action based on the authentication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A centralized identity system comprising:
   one or more processors; and
   one or more computer-readable hardware storage devices having thereon computer-executable instructions that are structured such that, when executed by the one or more processors, configure the centralized identity system to permit a decentralized identity of a decentralized identity system to authenticate on behalf of a centralized identity of a centralized system in response to receiving a delegation for the decentralized identity to authenticate as the centralized identity, wherein the decentralized identity system includes a distributed ledger configured to manage a root of trust via cryptographic trust verification, and the centralized system authenticates the centralized identity via a centralized identity register, the centralized identity system configured to:
   register the received delegation for the decentralized identity in the centralized identity register to authenticate as the centralized identity;
   receive a communication from the decentralized identity to access a resource owned by the centralized identity;
   in response to the communication, access the centralized identity register to determine that the decentralized identity is authorized to authenticate as the centralized identity;
   in response to the determination, authenticate the decentralized identity via cryptographic trust verification as the centralized identity; and
   in response to authenticating, grant the decentralized identity access to the resource owned by the centralized identity.

2. The centralized identity system in accordance with claim 1, the delegation being received by the centralized identity system using an extension of a centralized identity protocol.

3. The centralized identity system in accordance with claim 2, the communication being received in accordance with the centralized identity protocol.

4. The centralized identity system in accordance with claim 3, the authentication of the decentralized identity occurring in accordance with a decentralized identity protocol.

5. The centralized identity system in accordance with claim 1, the delegation being received by the centralized identity system as a claim of a centralized identity protocol.

6. The centralized identity system in accordance with claim 5, the communication being received in accordance with the centralized identity protocol.

7. The centralized identity system in accordance with claim 6, the authentication of the decentralized identity occurring in accordance with a decentralized identity protocol.

8. The centralized identity system in accordance with claim 1, the communication being received in accordance with a centralized identity protocol.

9. The centralized identity system in accordance with claim 8, the authentication of the decentralized identity occurring in accordance with a decentralized identity protocol.

10. A method for a decentralized identity system to permit a centralized identity of a centralized identity system to authenticate on behalf of a decentralized identity of a decentralized identity system, wherein the decentralized identity system includes a distributed ledger configured to manage a root of trust via cryptographic trust verification, and the centralized system authenticates the centralized identity via a centralized identity register, the method comprising:
    receiving a delegation for the centralized identity of the centralized system to authenticate for the decentralized identity of the decentralized system;
    registering the received delegation for the centralized identity in the centralized identity register to authenticate as the decentralized identity;
    receiving a communication from the centralized identity to access a resource owned by the decentralized identity;
    in response to the communication, accessing the centralized identity register to determine that the centralized identity is authorized to authenticate as the decentralized identity;
    in response to the determination, authenticating the decentralized identity via cryptographic trust verification as the centralized identity; and
    in response to authenticating, granting the centralized identity access to the resource owned by the decentralized identity.

11. The method in accordance with claim 10, the delegation being received by the decentralized identity system using an extension of a decentralized identity protocol.

12. The method in accordance with claim 11, the communication being received in accordance with the decentralized identity protocol.

13. The method in accordance with claim 12, the authentication of the decentralized identity occurring in accordance with the decentralized identity protocol.

14. The method in accordance with claim 10, the delegation being received by the decentralized identity system as a claim of a decentralized identity protocol.

15. The method in accordance with claim 14, the communication being received in accordance with the decentralized identity protocol.

16. The method in accordance with claim 15, the authentication of the decentralized identity occurring in accordance with the decentralized identity protocol.

17. The method in accordance with claim 10, the communication being received in accordance with a decentralized identity protocol.

18. The method in accordance with claim 17, the authentication of the decentralized identity occurring in accordance with the decentralized identity protocol.

19. A computer program product comprising one or more computer-readable hardware storage devices having thereon computer-executable instructions that are structured such that, when executed by one or more processors of a centralized identity system, configure the centralized identity system to permit a decentralized identity of a decentralized identity system to authenticate on behalf of a centralized identity of a centralized system in response to receiving a delegation for the decentralized identity to authenticate as the centralized identity, wherein the decentralized identity system includes a distributed ledger configured to manage a root of trust via cryptographic trust verification, and the centralized system authenticates the centralized identity via a centralized identity register, the centralized identity system configured to:

register the received delegation for the decentralized identity in the centralized identity register to authenticate as the centralized identity;

receive a communication from the decentralized identity to access a resource owned by the centralized identity;

in response to the communication, access the centralized identity register to determine that the decentralized identity is authorized to authenticate as the centralized identity;

in response to the determination, authenticate the decentralized identity via cryptographic trust verification as the centralized identity; and     in response to authenticating, grant the decentralized identity access to the resource owned by the centralized identity.

20. The computer program product in accordance with claim 19, the communication being received in accordance with a centralized identity protocol, the authentication of the decentralized identity occurring in accordance with the decentralized identity protocol.

\* \* \* \* \*